Figure 1:
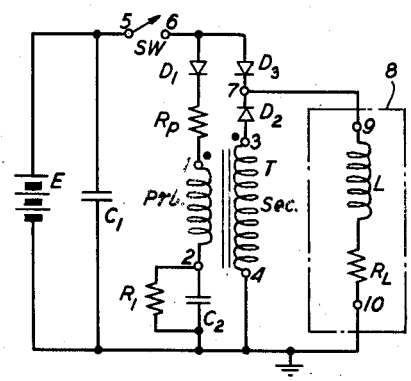

Sept. 15, 1964

C. E. BARNES ETAL 3,149,244

CIRCUIT FOR PRODUCING SHORT RISE TIME
CURRENT PULSES IN INDUCTIVE LOADS
Filed Nov. 7, 1960

INVENTORS C. E. BARNES
R. V. GOORDMAN
BY Donald M Duft

ATTORNEY

United States Patent Office 3,149,244
Patented Sept. 15, 1964

3,149,244
CIRCUIT FOR PRODUCING SHORT RISE TIME
CURRENT PULSES IN INDUCTIVE LOADS
Clare E. Barnes, Passaic Township, Morris County, and
Robert V. Goordman, Summit, N.J., assignors to Bell
Telephone Laboratories, Incorporated, New York,
N.Y., a corporation of New York
Filed Nov. 7, 1960, Ser. No. 67,634
17 Claims. (Cl. 307—104)

This invention relates to a pulse generator and, more particularly, to a pulse generator capable of producing short rise time current pulses in inductive loads.

As used in this specification, the term "pulses" includes both pulses of a high repetition rate, such as the output of a high frequency multivibrator, as well as those of a low repetition rate, such as the current wave form resulting from the periodic closure of a circuit for an extended duration followed by an opening of the same circuit.

Circuit designers often find it desirable to effect rapid current changes in inductive loads such as, for example, the windings of relays or magnetic cores. Rapid current changes are required in relay circuits to enable the relays to operate with a minimum of delay once an energizing potential is applied to their windings. This fast operate action can be achieved only if the winding current rapidly reaches the value necessary to operate the relay when its operating circuit is closed. Magnetic cores are often used in systems which perform their intended function by the interchange of pulse information between various cores in the circuit. It is usually desirable in such systems that the current pulses in the core windings have a short rise time in order that the pulse information can be interchanged at a high rate.

The rapid switching of currents and the production of short rise time current pulses in resistive loads present no problem since, for the most part, the resultant current follows the changes in applied voltage with little delay. Such is not the case in inductive circuits where the current lags the voltage changes by an appreciable amount.

The time required for the current to rise to the value at which an inductive device can perform its intended function is usually economically objectionable since it precludes a faster operation both of the device and the circuit of which it is a part. Considerable effort has been expended in attempting to increase the speed of operation of electromagnetic devices. For example, relay designers have minimized the mass of the moving elements and have utilized polarized windings in an attempt to produce relays having faster operate times. Also, magnetic core designers have utilized special winding configurations and core materials in attempts to produce cores which are capable of operating at higher pulse rates.

Although the aforementioned effort has been successful to some degree in producing faster operating electromagnetic elements, there is still room for considerable improvement. The main impediment currently preventing such improvement is the finite period of time required for the current in the windings to reach the value necessary to operate their associated devices once their energizing circuits are closed.

It is well known that the current produced in a series inductive circuit in response to the application of a voltage step function is $$I(t) = E/R\left(1 - e^{\frac{-tR}{L}}\right) \quad \text{(Equation 1)}$$

where E is the applied voltage and where R and L are the resistance and inductance, respectively, of the load. From this, one may obtain the familiar relationship $$\tau = 2.2 \frac{L}{R} \quad \text{(Equation 2)}$$

for the time $\tau$ required for the current to rise from 10 to 90 percent of its final value $E/R$.

Equation 1 expresses the magnitude of the current for all possible combinations of values for the variables $t$, $E$, $R$ and $L$. Equation 2 is not concerned with any particular current magnitude but instead, merely expresses the time required for the current in an inductive load to rise from 10 to 90 percent of its steady state value after its energizing circuit is closed. The value of $\tau$ in Equation 2 is thus a constant for a given load, is independent of $E$, and is commonly termed the rise time of the load.

It is obvious from an inspection of Equation 2 that the rise time for an inductive load can be decreased by increasing its resistance. However, an increase in load resistance requires a comparable increase in voltage if the steady state load current is to be held constant. Also, an increase in the resistance of a circuit through which a constant current is maintained increases the power dissipated in the circuit ($P=I^2R$) proportionately with the increase in resistance. This tends to limit the number of applications in which the rise time can be improved by an increase in the load resistance and the applied voltage since, in most cases, the resulting increase in power cannot be furnished by the power supply and/or dissipated by the load.

It may be seen from Equation 1 that the magnitude of the load current at any particular time is directly proportional to the applied voltage and that, if desired, the voltage can be increased in order to obtain either a larger current in the same time or the same current in a shorter time. For example, if the application of 10 volts to an inductive circuit produces a current of .2 ampere in 100 milliseconds, the voltage can be raised to 20 to develop a current of .4 ampere in the same time or to develop the same current of .2 ampere in a shorter time. It should be observed that increasing the voltage does not affect the rise time of the load as expressed in Equation 2 since the load current will still require the same time to rise from 10 to 90 percent of its new steady state value.

It is apparent from the foregoing that, if no other circuit limitations were present, circuit designers could merely raise the applied voltage to reduce the time required to drive a predetermined current through an inductive device and thereby cause it to perform its intended function in a shorter time. However, increasing the voltage also increases the steady state current and, therefore, in most circuit applications, shorter rise times cannot be obtained by this expedient since the resulting steady state current and power dissipation in the load becomes objectionable.

It is therefore an object of the invention to facilitate the faster switching of currents in inductive loads.

It is a further object of the invention to produce current pulses having a shorter rise time in inductive loads.

It is a further object of the invention to achieve the aforementioned objects without a concomitant rise in steady state power.

The present invention reduces the time required for a desired magnitude of current to be produced in an inductive load by temporarily lowering its rise time $$\left(\tau = 2.2 \frac{L}{R}\right)$$

and by simultaneously raising the applied voltage for a time sufficient to enable the current to rise to the desired value. Once this current is attained, the rise time is restored to its original value and the applied voltage is reduced to the value necessary to maintain the current at the required steady state level. More specifically, the present circuit, upon the initiation of each pulse or whenever it is desired to effect a rapid increase in current, temporarily inserts a resistance in series with the load and simultaneously applies sufficient voltage to the resulting series circuit to enable the load current to rise to a desired magnitude in a period of time determined by the new rise time of the load. Once the desired load current is obtained, the series load resistor and the high voltage source are removed and a second voltage source of lower potential is connected to the load to maintain the steady state current at the desired value for the duration of the pulse or the switching interval.

The high voltage supply comprises a step-up transformer of turns ratio N whose secondary is connected in series with a diode which, in turn, is in series with the load. The primary of the transformer is connected in series with a resistor and a condenser between ground and a switch terminal to which a potential E is applied when the switch is closed. The closure of the switch upon the initiation of the pulse completes a circuit for the condenser to charge in series with the resistor and the transformer primary. The resulting current in the primary induces a voltage substantially equal to NE in the secondary which is applied to the load in series with the reflected primary resistance and which, in turn, rapidly raises the load current to the desired value. The time constant of the load seen by the secondary is $$\tau = 2.2 \frac{L}{R_L + R_S}$$

where $R_S$ equals the reflected impedance of the primary circuit and where $R_L$ equals the load resistance. The primary series resistance is chosen to be of such a value whereby the total energy supplied by the secondary is limited and whereby the voltage applied to the load decays to the value E at the same time that the load current reaches the desired steady state value. The source E, which comprises the second power supply, is also connected to the load through a diode and maintains the steady state load current for the duration of the circuit closure when the potential supplied by the transformer secondary continues to decay as the condenser becomes fully charged.

The sequential application of the two voltages as described results in approximately an N times improvement in the time required to achieve a given load current. This improvement in rise time is achieved with much less than N times increased power from the source E and with less than N times increased power dissipation in the load, for pulse repetition periods long compared to $\tau$, since the load current never exceeds the steady state current resulting from the application of the steady state current resulting from the application of the potential E to the load.

A feature of the invention is the provision of a circuit for producing short rise time current pulses in inductive loads by momentarily reducing the time constant of the load for a time sufficient to enable a desired current to be attained and by then restoring the time constant to its normal value while maintaining the steady state current at the desired value.

A further feature of the invention is the provision of a circuit for effecting the faster switching of currents in inductive loads by sequentially applying two different potentials to the load each time a rapid increase in current is desired.

A further feature of the invention is the provision of a circuit for producing short rise time current pulses in inductive loads by first applying a relatively high potential to the load followed by the application of a relatively low potential thereto.

A further feature of the invention is the provision of a circuit for effecting the rapid switching of currents in inductive loads by applying a relatively high potential to the load until the current reaches a predetermined value and by then removing the high potential and applying a relatively low potential to maintain the current at the predetermined value.

A further feature of the invention is the provision of a circuit for producing short rise time current pulses in inductive loads comprising a step-up transformer whose secondary momentarily applies a high potential to the load to effect a desired current therein together with means for removing this high source of potential and for connecting a lower potential to the load as the current reaches the desired magnitude.

Figure 3:
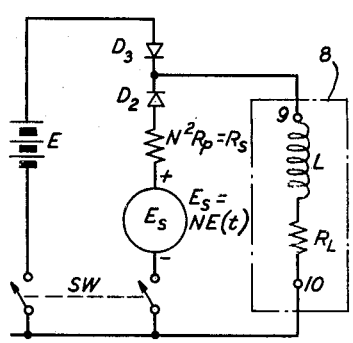
Figure 2:
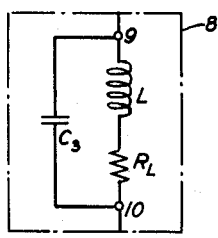
Figure 5:
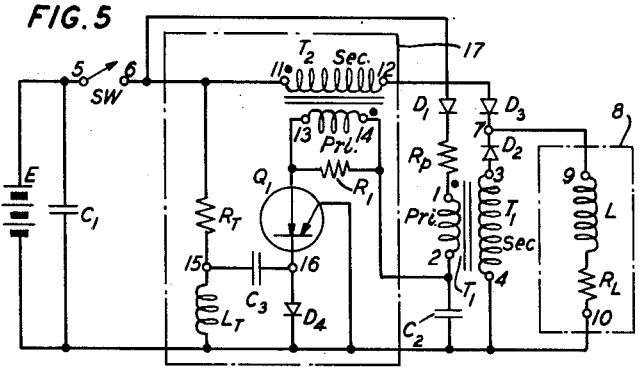
Figure 4:
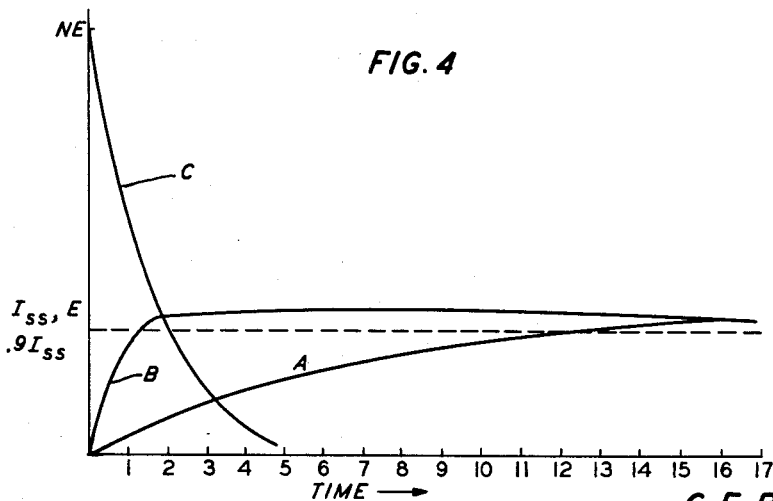

These and other objects and features will become apparent upon a reading of the following description of the invention taken in conjunction with the accompanying drawings in which:

FIG. 1 discloses the circuit of an exemplary embodiment of the invention;

FIG. 2 discloses an alternative connection for the load shown in FIG. 1;

FIG. 3 discloses the circuit of FIG. 1 in equivalent form;

FIG. 4 discloses certain voltage and current wave forms pertinent to FIG. 1; and FIG. 5 discloses a modification of FIG. 1 which eliminates arcing of the switch contacts upon the termination of a pulse.

The circuit details of the present invention together with the inductive load through which the rapid changes in current are effected are shown on FIG. 1. The load is shown within the rectangle 8 and comprises inductance L and resistance $R_L$ which are connected in series between terminals 9 and 10. Resistance $R_L$ may comprise the internal resistance of the inductance or it may comprise the resistance of the inductance together with any resistance inserted in series therewith. The lower portion of the load is connected via terminal 10 to a common ground. The upper portion of the load is connected in series with diode D3 to the terminal 6 side of switch SW. Terminal 9 of the load is also connected in series with diode D2 and the secondary of transformer T to ground. The primary of the transformer is connected in a series circuit which extends from the terminal 6 side of the switch to ground and which comprises diode D1, resistor $R_p$, the primary winding, and a parallel network comprising resistor R1 and condenser C2.

The power source for this circuit is represented by the battery E which may comprise any type of power supply capable of furnishing the required voltage and current. Condenser C1 shunts battery E in order to minimize voltage fluxuations during periods of momentarily heavy load currents. The switch is closed to initiate a current in the load and is opened to terminate the load current. The switch, which is shown to be of the mechanical type, may comprise any type of switch known in the art such as a vacuum tube, a thyratron, a transistor, et cetera.

The closure of switch SW applies the positive potential of battery E to terminal 6. Condenser C2, which is discharged at this time, presents a momentary low impedance path to ground for the series circuit comprising diode D1, resistor $R_P$, and the primary of the transformer. The initial current in this circuit is limited only by the resistance of resistor $R_P$ and the reflected resistance of the secondary and thus, when the switch is closed, the current rapidly reaches the value $$\frac{E}{R_P + \frac{R_L}{N^2}}$$

The drop across the resistance in this circuit is negligible so that almost all the entire battery potential E appears across the primary of the transformer which, in turn, induces a voltage of approximately NE in the secondary. The secondary potential NE is impressed on a series circuit comprising the reflected resistance of the primary $R_S$, the diode D2 and the load 8. The reflected resistance from the primary is effectively in series with the load resistance so that the rise time of the load offered to the secondary becomes $$2.2 \frac{L}{R_S + R_L}$$

The potential NE impressed upon this load causes the load current to increase towards the desired value at a rate governed by the rise time of the effective load now seen by the secondary.

Diode D3 is back biased at this time and prevents the battery E from shunting the secondary. The current through the primary decays exponentially as condenser C2 becomes charged and, in turn, causes the voltage induced in the secondary to decay. The transformer also has a voltage decay which is a function of its lower 3 db down frequency. The higher the transformer lower 3 db down frequency, the shorter will be its decay time. The load current continues to increase towards the desired value and, as long as the potential appearing across the secondary is greater than the potential E, the load current increases at a more rapid rate than could be effected by the application of the potential E alone to the load. The primary current continues to decrease as the condenser becomes charged and the transformer decays and, in turn, causes the secondary voltage to continue its decrease so that it finally becomes less than the voltage from source E. At this time, the diode D3 is no longer back biased and source E is then effectively applied to the load to maintain the steady state current for the duration of the pulse. At this time, diode D2 is back biased so that current from source E does not appear in the secondary winding.

When switch SW is opened to terminate the pulse, the polarity of diode D1 opposes any circulating currents that might be induced in the primary due to inductive surges on the load. This high impedance condition of the primary is reflected into the secondary where it appears as practically an open circuit to the load so that the load current rapidly falls to zero. Resistor R1 provides a path for condenser C2 to discharge during the open periods of the switch. It is chosen to be of such a value that it does not appreciably increase the primary current during closure of the switch and yet permits condenser C2 to discharge before the switch is closed to initiate the next pulse.

The value of resistor $R_P$ is somewhat critical since it is the determinating factor which insures that the peak current induced in the load by the secondary does not exceed the steady state current $E/R_L$. In order to determine the value of resistor $R_P$, let it be assumed that the transformer comprises a voltage step function generator which supplies a voltage $E_S = NEf(t)$ where E is the battery voltage, where $E_S$ is the secondary voltage, and where N is the transformer turns ratio. Let the impedance of the generator be the transformed primary impedance $R_S = N^2 R_P$. This is shown in FIG. 3 which discloses the circuit of FIG. 1 in equivalent form. The peak current induced in the load by the secondary is $$I_S = \frac{NE}{R_S + R_L}$$

In order to obtain the faster rise time without overshoot, the peak secondary current $I_S$ is made equal to the steady state current $E/R_L$ since this is the current that the battery supplies in the absence of the transformer. Equating $$I_S = \frac{NE}{R_S + R_L} = \frac{E}{R_L}$$

and solving for the total series resistances $R_S + R_L$ gives $R_S + R_L = NR_L$ or $R_S = (N-1)R_L$. Inspection of this circuit in light of the expression for the rise time in Equation 2 shows that the new rise time is $$\tau_S = 2.2 \frac{L}{R_S + R_L} = 2.2 \frac{L}{NR_L} = \frac{\tau}{N}$$

Thus, this circuit provides an improvement in rise time by the factor N.

The actual voltage $E_S$ appearing across the secondary of the transformer in FIG. 1 is not a step function as assumed in FIG. 3 but, instead, is a potential which rises sharply and then decays exponentially as condenser C2 charges and the transformer decays. However, the secondary potential remains sufficiently high for a period of time long enough to produce a rise time improvement of almost N times as predicted in the foregoing analysis.

FIG. 4 discloses various wave forms appearing in the circuit of FIG. 1 when a transformer having a step-up ratio of 12 is used. Curve A represents the rise in load current in response to the application of the potential E alone to the load. As shown, the current rises relatively slowly in an exponential manner and reaches 90 percent of its steady state value at point 12 on the time scale. Curve B discloses the current produced in the load by the present invention. As shown, the current reaches 90 percent of its steady state value at time 1 and thus represents a 12 times improvement in rise time. Curve C represents the voltage appearing across the secondary upon the closure of the switch. As shown, this voltage rises almost instantaneously to the potential NE and then decays exponentially as the condenser becomes charged and the transformer decays. Providing that a resistor of the proper value is used for resistance $R_P$, the secondary potential decays from NE to E at the time that the load current provided by the secondary approximately equals the final steady state value $E/R_L$. The battery source E becomes effective at that time and maintains the load current at the steady state value for the duration of the pulse.

FIG. 5 discloses how the circuit of FIG. 1 can be modified to eliminate any possible arcing of the switch contacts upon the termination of a pulse. In FIG. 1 the induced voltage developed by the inductance of the load whenever the switch is opened, appears across the switch contacts. The amplitude of this voltage $$\left(-L\frac{di}{dt}\right)$$

which is dependent upon the load inductance and the speed with which the switch contacts separate, can readily approach the vicinity of 500 or 600 volts. This induced potential forward biases diode D3 in FIG. 1 and may produce arcing at the switch contacts as it attempts to complete a path for itself and thereby permit a continued current in the load.

The circuit of FIG. 5 differs from that of FIG. 1 in that condenser C2 is no longer shunted by a resistor and by the addition of the circuit elements contained within the rectangle 17. The operation of the circuit of FIG. 5 upon the initiation of a pulse is identical to that of FIG. 1 in that condenser C2 is charged over the same circuit from the potential E on contact 6 of the switch. The steady state current for the load is supplied through diode D3 and an additional element comprising the secondary of transformer T2. The D.C. resistance of this winding is sufficiently low so that it has no appreciable effect on the steady state load current.

When the switch is open to terminate a pulse, the elements within rectangle 17 become effective to cancel the self-induced potential of the load and thereby minimize the resulting potential difference across the switch contacts. Specifically, the opening of the switch interrupts the current through the series circuit comprising resistor $R_T$ and inductance $L_T$ which is effectively across the battery E when the switch is closed. The interruption of this current causes the inductance $L_T$ to produce a large amplitude negative pulse at its upper terminal 15. This negative pulse is applied through condenser C3 to terminal 16 where it momentarily forward biases the solid state thyratron Q1 which then fires and discharges condenser C3 through the primary of transformer C2 and diode D4 to ground. The discharge current through the primary produces a potential in the secondary of step-up transformer T2 which is approximately equal to that induced in the load. The induced potential in the secondary of transformer T2 is connected in series opposition to that induced in the load so that the resulting potential across the switch contacts is greatly minimized. Resistor R1 is selected to be of a value which permits the secondary to appear as a low impedance for the steady state load current but yet, also permits enough of the discharge current of condenser C2 to flow through the primary to develop the desired opposition potential as the switch contacts are opened.

It is to be understood that the above described arrangements are but illustrative of the application of the principles of the invention. Numerous other arrangements may be devised by those skilled in the art without departing from the spirit and scope of the invention. For example, the nature of the load current rise may be changed from exponential to sinusodial by shunting the load 8 in FIG. 1 by a condenser C3 as shown in FIG. 2. This results in a further improvement in rise time of approximately 1.6 due to the steeper leading portion of the sinusoidal wave.

What is claimed is:

1. In a circuit for producing short rise time current pulses in inductive loads, a source having a potential E with respect to ground, a two contact switch one of whose contacts is connected to said potential E, an inductive load one side of which is grounded, a diode interconnecting the other contact of said switch and the other side of said load with the cathode terminal of said diode being connected to said load, a step-up transformer having a primary and a secondary winding and a turns ratio N, a second diode interconnecting one side of said other side of said secondary and said load with the cathode terminal of said second diode being connected to said load, means connecting the other side of said secondary to ground, a condenser connected between ground and one side of said primary, and a resistor connected between the other side of said primary and said second contact of said switch for controlling the peak current produced in said load by the secondary as said switch is closed.

2. In a circuit for producing current pulses having a short rise and fall time in inductive loads, a source having a potential E with respect to ground, a two contact switch one of whose contacts is connected to said potential E, an inductive load one side of which is grounded, a first forwardly poled diode interconnecting the other contact of said switch and the other side of said load, a step-up transformer having a primary and a secondary winding and a turns ratio N, a second forwardly poled diode interconnecting one side of said secondary and said other side of said load, means connecting the other side of said secondary to ground, a condenser connected between ground and one side of said primary, a resistor connected between the other side of said primary and said second contact of said switch for controlling the peak current produced in said load by the secondary as said switch is closed, a transformer having a winding interconnected between said first diode and said switch, means responsive to the opening of said switch for discharging said condenser through a second winding of said last named transformer, and means responsive to said discharge whereby said last named transformer generates a potential in opposition to the self-induced potential of the load to minimize the resultant potential across the switch contacts.

3. A circuit for producing short rise time current pulses in inductive loads comprising, an inductive load, a source of potential E1 capable of maintaining a current I in said load, a switch operable to effect a current pulse in said load, means effective upon the operation of said switch for generating and applying to said load a time-wise decaying potential E2 having an initial magnitude greater than E1, and means effective when the load current resulting from the application of said potential E2 equals I for connecting said source of potential E1 to said load to maintain said current I therein.

4. In a circuit for producing short rise time current pulses in inductive loads, a source of potential E1, an inductive load, a switch operable to effect a current pulse in said load, means effective upon the operation of said switch for generating and applying to said load a time-wise decaying potential E2 having an initial magnitude greater than E1, means effective when said potential E2 has decayed to a magnitude equal to E1 for connecting said source of potential E1 to said load, and means effective for disconnecting said potential E2 from said load when it decays to a magnitude less than E1.

5. In a circuit for producing short rise time current pulses in inductive loads, a source of potential E, a step-up transformer having a turns ratio N, an inductive load, a switch operable to effect a current pulse in said load, means effective upon the operation of said switch whereby said transformer generates and applies to a circuit comprising said load and induced time-wise decaying potential having an initial magnitude of NE, and means whereby said source of potential E is subsequently applied to said load when said induced potential decays to a magnitude equal to E.

6. A circuit for producing short rise time current pulses in inductive loads comprising, an inductive load, a source of potential E capable of effecting a current I in said load, a step-up transformer having a turns ratio N, a switch operable to effect a current pulse in said load, means effective upon the operation of said switch whereby said transformer generates and applies to a circuit comprising said load and induced time-wise decaying potential having an initial magnitude of NE, and means effective when the load current resulting from the application of said induced potential equals said current I for applying said source of potential E to said load.

7. In a circuit for producing short rise time current pulses in inductive loads, a source of potential E, a step-up transformer having a turns ratio N, an inductive load, a switch operable to effect a current pulse in said load, means effective upon the operation of said switch whereby said transformer generates and applies to a circuit comprising said load an induced time-wise decaying potential having an initial magntude of NE, means effective when said induced potential decays to a magnitude equal to E for applying said source of potential E to said load circuit, and means effective as said induced potential decays to a magnitude less than E for disconnecting said induced potential from said load circuit.

8. In a circuit for producing short rise time current pulses in inductive loads, a source of potential E, a condenser, a step-up transformer having a primary and a secondary winding and a turns ratio N, an inductive load, a switch operable to effect a current pulse in said load, means effective upon the operation of said switch whereby said condenser charges from said source of potential E through the primary winding of said transformer to produce an induced time-wise decaying potential having an initial magnitude of NE in its secondary winding, means for applying said induced potential to said load, and means whereby said source of potential E is applied to said load when said induced potential decays to a magnitude equal to E.

9. A circuit for producing short rise time current pulses in inductive loads comprising, an inductive load, a source of potential E capable of sustaining a current I in said load, a condenser, a step-up transformer having a primary and a secondary winding and a turns ratio N, a switch operable to effect a current pulse in said load, means effective upon the operation of said switch whereby said condenser charges from said source of potential E through the primary winding of said transformer to produce an induced time-wise decaying potential having an initial magnitude of NE in its secondary winding, means for applying said induced potential to said load, and means effective when the load current resulting from the application of said induced potential equals said current I for applying said source of potential E to said load.

10. In a circuit for producing short rise time current pulses in inductive loads, a source of potential E, a condenser, a step-up transformer having a primary and a secondary winding and a turns ratio N, an inductive load, a switch operable to effect a current pulse in said load, means effective upon the operation of said switch whereby said condenser charges from said potential E through the primary winding of said transformer to produce an induced time-wise decaying potential having an initial magnitude of NE in its secondary winding, means for applying said induced potential to a circuit comprising said load, means effective when said induced potential decays to a magnitude equal to E for connecting said source of potential E to said load and means effective for disconnecting said induced potential from said load circuit as it decays to a magnitude less than E.

11. In a circuit for producing short rise time current pulses in inductive loads, a source of potential E, a condenser, a step-up transformer having a primary and a secondary winding and a turns ratio N, an inductive load, means for charging said condenser from said potential E through the primary winding of said transformer to induce a time-wise decaying potential having an initial magnitude of NE in its secondary winding, means for applying said induced potential through a first diode to said load, and means whereby said source of potential E is applied through a second diode to said load as said induced potential decays in magnitude to E.

12. A circuit for producing short rise time current pulses in inductive loads comprising, an inductive load, a source of potential E capable of sustaining a current I in said load, a condenser, a step-up transformer having a primary and a secondary winding and a turns ratio N, a switch operable to effect a current pulse in said load, means effective upon the operation of said switch whereby said condenser charges from said source of potential E through the primary winding of said transformer to induce a time-wise decaying potential having an initial magnitude of NE in its secondary winding, means for applying said induced potential through a first diode to said load, and means effective when the load current resulting from the application of said induced potential equals said current I for applying said source of potential E to said load.

13. In a circuit for producing short rise time current pulses in inductive loads, a source of potential E, a condenser, a step-up transformer having a primary and a secondary winding and a turns ratio N, an inductive load, a switch operable to effect a current pulse in said load, means effective upon the operation of said switch whereby said condenser charges from said potential E through the primary winding of said transformer to induce a time-wise decaying potential having an initial magnitude of NE in its secondary winding, means for applying said induced potential through a first diode to a circuit comprising said load, means effective when the load current resulting from the application of said induced potential equals a predetermined current for applying said source of potential E to said load, and means effective for disconnecting said induced potential from said load as it decays in magnitude to less than E.

14. In a circuit for producing pulses having short rise and fall times in inductive loads, a potential E1, an inductive load, a switch operable to effect a current pulse in said load upon the closing of its contacts and the termination of a pulse in said load upon the opening of its contacts, means effective upon the closure of said switch whereby a time-wise decaying potential E2 having an initial magnitude greater than E1 is developed and applied to said load, means whereby said potential E1 is applied through the contacts of said switch to said load subsequent to said application of said potential E2 to maintain the load current at a steady state magnitude, means interconnecting said load and said switch, and means including said last-named means effective upon the opening of the contacts of said switch for generating and applying across the contacts of said switch in series with said load a potential in opposition to the self-induced potential developed by said load as said switch is opened thereby minimizing the resultant potential across the switch contacts.

15. In a circuit for producing current pulses having short rise and fall times in inductive loads, a source of potential E, a step-up transformer having a turns ratio N, an inductive load, a switch, means effective upon the closure of said switch whereby said transformer generates and applies an induced time-wise decaying potential having an initial magnitude of NE to said load, means whereby said source of potential E is applied to said load following the application of said induced potential to maintain the load current at a steady state magnitude, a second transformer having a winding interconnecting said load and said switch, and means effective upon the opening of said switch whereby said second transformer generates a potential in its winding in opposition to the self-induced potential of the load resulting from the opening of said switch thereby minimizing the resultant potential across the switch contacts.

16. In a circuit for producing current pulses having short rise and fall times in inductive loads, a source of potential E, a condenser, a step-up transformer having a primary and a secondary winding and a turns ratio N, an inductive load, a switch, means effective upon the closure of said switch whereby said condenser charges from said source of potential E through the primary winding of said transformer to induce a time-wise decaying potential having an initial magnitude of NE in its secondary winding, means for applying said induced potential through a first diode to said load with said diode having its cathode connected to said load, means whereby said source of potential E is applied from said switch through a second diode to said load subsequent to the application of said induced potential with the cathode of said second diode being connected to said load, a second transformer having a winding inter-connected between one contact of said switch and the anode of said second diode, and means effective upon the opening of said switch whereby said second transformer generates in its winding a potential in opposition to the self-induced potential of the load thereby minimizing the resultant potential across the switch contacts.

17. In a circuit for producing current pulses having short rise and fall times in inductive loads, a source of potential E, a condenser, a step-up transformer having a primary and a secondary winding and a turns ratio N, an indutcive load, a switch, means effective upon the closure of said switch whereby said condenser charges from said source of potential E through the primary winding of said transformer to induce a time-wise decaying potential having an initial magnitude of NE in its secondary winding, means for applying said induced potential through a forwardly poled first diode to said load, means effective when the load current resulting from the application of said induced potential equals a predetermined current for applying said source of potential E from said switch to said load, a second transformer having a first winding interconnected between said switch and said load, and means effective upon a subsequent opening of said switch for discharging said condenser through a second winding of said second transformer, said first winding of said second transformer being effective upon said discharge for generating a potential in opposition to the self-induced potential of the load resulting from the opening of said switch thereby minimizing the resultant potential across said switch contacts.

References Cited in the file of this patent

UNITED STATES PATENTS 2,941,125     Lippincott     June 14, 1960

OTHER REFERENCES

Publication: I.B.M. Tech Bull., volume 2, No. 5, February 1960, page 85.